United States Patent [19]
Hayden et al.

[11] Patent Number: 5,488,282
[45] Date of Patent: Jan. 30, 1996

[54] SYSTEM AND METHOD FOR RECONDITIONING SPACECRAFT BATTERY

[75] Inventors: Joseph H. Hayden, Rancho Palos Verdes; Steven J. Stadnick, Lakewood, both of Calif.

[73] Assignee: Hughes Aircraft Company, Los Angeles, Calif.

[21] Appl. No.: 81,503

[22] Filed: Jun. 23, 1993

[51] Int. Cl.$^6$ .............................. H01M 10/44; H02J 7/00
[52] U.S. Cl. .................. 320/14; 320/17; 320/19; 320/4
[58] Field of Search .............................. 320/5, 6, 14, 15, 320/17, 18, 19, 4

[56] References Cited

U.S. PATENT DOCUMENTS

| | | | |
|---|---|---|---|
| 3,454,859 | 7/1969 | Ford et al. | 320/6 |
| 3,997,830 | 12/1976 | Newell et al. | 320/5 |
| 3,997,842 | 12/1976 | Pexa | 325/67 |
| 4,616,170 | 10/1986 | Ustoger | 320/5 |
| 5,177,425 | 1/1993 | Goto | 320/6 |

FOREIGN PATENT DOCUMENTS

| | | | |
|---|---|---|---|
| WO93/10589 | 5/1993 | WIPO | 320/5 |

*Primary Examiner*—Peter S. Wong
*Assistant Examiner*—Robert Nappi
*Attorney, Agent, or Firm*—Elizabeth E. Leitereg; Terje Gudmestad; W. K. Denson-Low

[57] ABSTRACT

A battery reconditioning system and method for a spacecraft which utilizes a single battery as a secondary source of power for spacecraft electrical loads (10). The battery (14) includes a plurality of serially connected packs (30–36) each including a plurality of cells (40–46) connected in series. Sensors (50–56) are provided with each pack for sensing the state of charge of the pack. Battery charging circuitry (12,18,20) is controlled from control circuitry (22,52) which is responsive to the state of charge sensors as well as commands from a ground station transceiver (57). Reconditioning resistors (60–66) are adapted to be connected across the individual packs through switches (70–76) which are controlled by the control circuitry to discharge the pack at a relatively high rate when reconditioning is desired. After a pack is discharged to a desired low state of charge, its reconditioning resistor is disconnected and all packs are recharged in series. A pair of diodes (80A,80B–86A,86B) are connected across each pack and provide a low resistance current path in the event a fault clearing current is required from the battery during reconditioning of a pack.

9 Claims, 2 Drawing Sheets

SYSTEM AND METHOD FOR RECONDITIONING SPACECRAFT BATTERY

TECHNICAL FIELD

This invention relates to systems and methods for reconditioning spacecraft secondary sources of power and more particularly to such an invention where the secondary source comprises only a single battery and where a fault clearing capability is maintained during the reconditioning process.

BACKGROUND ART

Satellites and other space vehicles normally include an array of solar cells that convert solar energy to electrical energy and provide the primary source of power for operating the various onboard electrical loads. Rechargeable batteries are provided as a secondary source of electrical power when solar energy is not available or is insufficient. It is desirable to periodically recondition the batteries through a process that involves fully discharging and recharging the batteries.

In one prior art reconditioning system, see for example Newell et al 3,997,830, a plurality of batteries is provided and each battery is reconditioned in sequence so that part of the total secondary energy storage capability is always maintained on line for power demands that might occur during the reconditioning process. The individual cells of a battery are discharged simultaneously by connecting resistors across the cells. The terminal voltage of the battery being reconditioned is monitored and when a predetermined low level is reached the battery is connected to the solar array through battery charging circuitry and recharged. The additional battery or batteries and associated charge and discharge electronics represents a significant weight and cost penalty.

The battery is also an emergency source of high current to clear faults that may occur on the spacecraft. It is desirable that this capability be available during the reconditioning process. Where a plurality of batteries is available this requirement is readily met, however the weight and cost tradeoff may be prohibitive.

SUMMARY OF THE INVENTION

In view of the above, it is an object of the present invention to provide a system and method for reconditioning a spacecraft secondary electrical power source that includes only a single battery.

It is another object of the present invention to provide such a system and method in which the single battery secondary source retains a fault clearing capability during reconditioning.

It is another object of the present invention to provide a method of reconditioning a single battery secondary source in a spacecraft while maintaining a reservoir of emergency power during the reconditioning of the battery to be able to respond to electrical faults on the spacecraft.

It is another object of the present invention to recharge the battery packs during the reconditioning sequence using the same charge and charge termination circuitry that normally recharges the battery.

According to the present invention a reconditioning system and method are provided which sequentially reconditions the individual packs of a single battery secondary power source. The state of charge of the serially connected packs that form the battery is monitored from a ground station. A reconditioning schedule is initiated from the ground station and insures that sufficient power is available from the battery if needed during the reconditioning process. When reconditioning is needed, the trickle charge normally applied to the battery is ended and one pack is shunted with a reconditioning resistor that is sized to fully discharge the battery pack in approximately 100 hours. After the pack has been fully discharged, the reconditioning resistor is removed and all packs are simultaneously charged. The rate of charge of each pack is controlled by connecting or disconnecting its associated reconditioning resistor in shunt with the pack. Each pack is reconditioned in sequence with charge termination control being provided by a signal from one of the packs that has not yet been reconditioned. Each pack is provided with a high current bypass circuit comprising a pair of diodes that allow fault clearing current to bypass the pack should the pack become reversed biased during the reconditioning process.

BRIEF DESCRIPTION OF THE DRAWINGS

A more thorough understanding of the present invention may be had from the following detailed description that should be read with the drawings in which.

DETAILED DESCRIPTION OF PREFERRED EMBODIMENT

Figure 1:
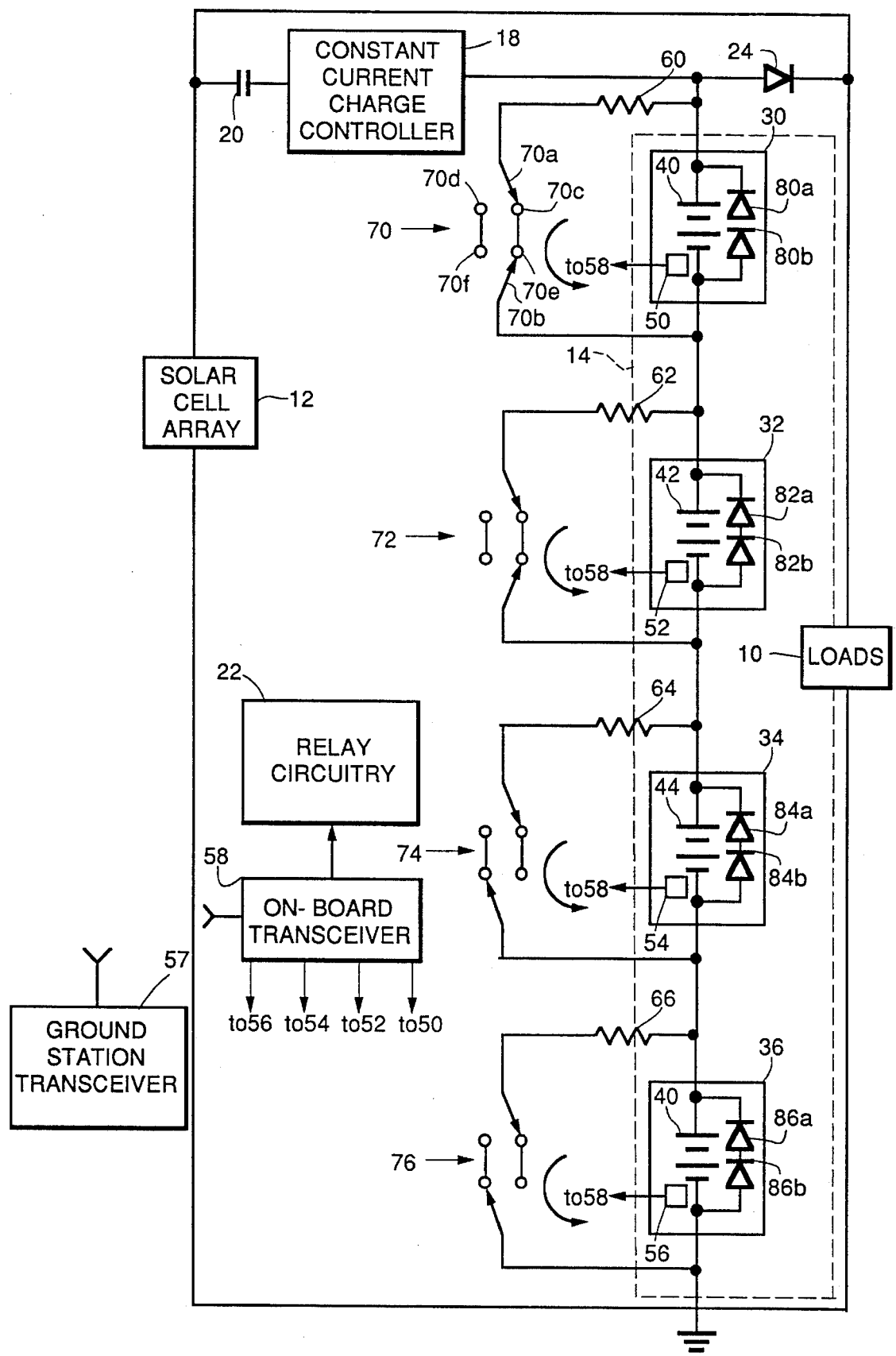
FIG. 1 is a block diagram of the preferred embodiment of the invention.

Referring now to the drawings and initially to FIG. 1, the various electrical loads of the spacecraft are generally designated 10. The primary source of power for the load 10 is provided by an array of solar cells generally designated 12. A secondary or auxiliary source of power is provided by a battery generally designated 14. The battery 14 is connected with and charged from a constant current charge controller 18, which is adapted to be connected to the array 12 through a switch device generally designated 20 under the control of relay circuitry 22. Normally, power is supplied to the load 10 from the array 12 but may be supplied as needed by the battery 14 through the diode 24. Alternatively, the diode 24 may be replaced with circuitry which regulates the battery discharge voltage while also allowing current flow in one direction only.

The battery 14 comprises a plurality of packs 30, 32, 34 and 36 each of which include a plurality of cells, for example eight, as shown generally at 40–46 respectively. The battery 14 is preferably a nickel hydrogen battery in which each of the eight cells of each pack is a pressure vessel as is well known in the art. The pressure in one of the eight cells in each pack 30–36 is monitored by pressure sensors 50–56 that are preferably strain gauges that provide a direct indication of the state of charge of the battery pack based on the pressure in the cells. Each of the strain gauges includes pressure sensitive resistors connected in a conventional bridge circuit where two nodes of each bridge are connected with a suitable 10 volt supply and provide an output across the other two nodes that is suitable amplified to provide a control output.

A communication link with the spacecraft is established by a microprocessor based ground station transceiver 57 and a microprocessor based onboard transceiver 58. The state of charge information from each sensor 50–56 is input to the transceiver 58 and transmitted to the transceiver 57 so that the state of charge of the various packs 30–36 is continuously available to ground station personnel. The state of charge information is also used by the transceiver 58 to command the relay circuitry 22 to open the switch device 20 and terminate charging of the battery 14 when a selected sensor 50–56, senses that its associated pack is fully charged.

Reconditioning resistors 60, 62, 64 and 66 are adapted to be connected across the packs 30, 32, 34 and 36, respectively through switches generally designated 70, 72, 74 and 76. Each switch 70–76 provides a redundant means of connecting and disconnecting the reconditioning resistors 60–66 so that in the event one of the armatures of the relay that controls these switches becomes stuck in one position, the circuit can be completed or interrupted through operation of the other relay armature. The switches 70–76 are positioned under the control of the relay circuitry 22 in response to commands from the transceiver 58.

Serially connected diode pairs 80A, 80B are connected in parallel with the pack 30 with the cathode of diode 80A connected to the positive terminal of the pack 30 and the anode of the diode 80B connected with the negative terminal of the pack 30. Diode pairs 82A, 82B; 84A, 84B and 86A, 86B are similarly connected in parallel with the packs 42, 44 and 46, respectively. As previously mentioned, the cells of the battery 14 are formed of nickel and hydrogen. Preferably, the cells include an excess of nickel, which is to say, the cells are formed with a nickel precharge. Such a battery has the advantage of extended shelf life but there is a propensity to develop a significant reverse voltage across the cell if current is forced through the cell in the reverse direction. Should a fault occur during reconditioning of a pack the large fault current drawn from the battery 14 would destroy any cells that are reverse biased at the time the fault occurred. To avoid this possibility the diode pairs in parallel with the packs are poled to become forward biased whenever the associated pack becomes reversed biased. The diode pairs, when forward biased, thus provide a low resistance current path in parallel with their respective cells. Should the battery be hydrogen precharged or should reconditioning be postponed until the nickel precharged battery reverts to hydrogen precharge, then the bypass diodes 80A, 80B through 86A, 86B may be eliminated since the hydrogen precharge battery cells can pass current in the reverse direction without developing reverse voltages that might be detrimental to battery life.

Figure 2:
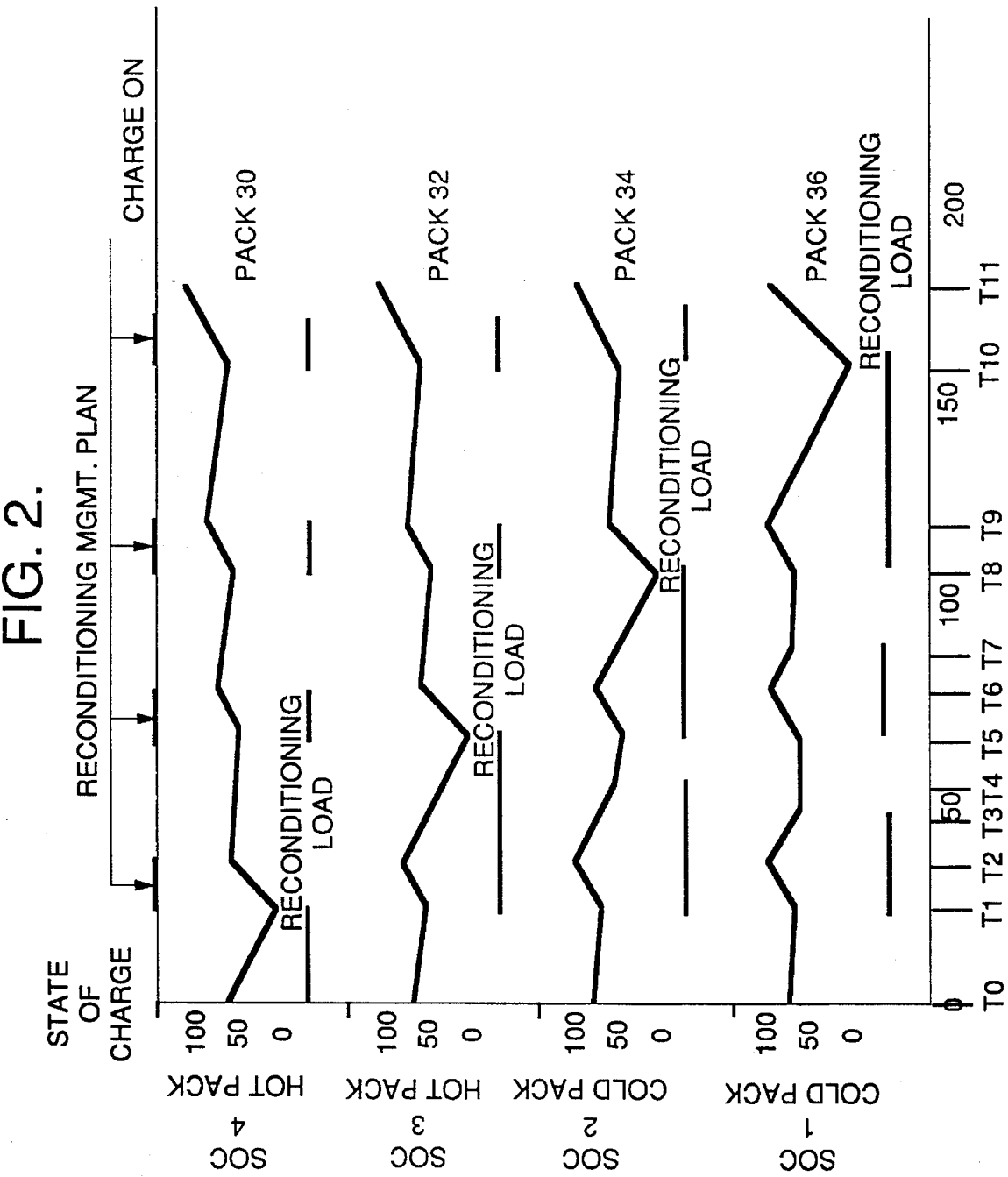
FIG. 2 is a reconditioning management plan showing the state of charge of the various packs of the secondary battery.

Referring now to FIG. 2, a suitable reconditioning management plan for the packs 30–36 is shown. The reconditioning strategy has four objectives, namely: (1) to recondition each pack down to approximately zero volts; (2) to always have at least three of the four packs with a minimum of 45% state of charge; (3) to minimize the time required to recondition all four packs; and (4) to avoid or at least minimize overcharging of any of the packs.

Preferably, two of the packs, for example 30 and 32, are located on one side of the spacecraft while the other two packs 34, 36 are located on the other side of the spacecraft so that the pairs of packs alternately are exposed to the sun to achieve a more uniform self discharge. Reconditioning of the battery 14 is initiated from the ground station transceiver 57 when the state of charge information transmitted, from the spacecraft to the ground station, shows that one or more of the packs 30–36 is approaching 50% of full charge. This condition is shown in FIG. 2 at time T0, where the state of charge of packs 30 and 32 is approximately 86% and the state of charge of packs 34 and 36 is approximately 80%.

The reconditioning process is initiated by closing the circuit connecting the reconditioning load 60 across the pack 30. At this time, the pack 30 begins to discharge at a relatively rapid rate, as shown by the slope of the line segment between T0 and T1, and becomes fully discharged at time T1. During the interval when pack 30 is being reconditioned, the switches 72, 74 and 76 are open and the packs 32, 34 and 36 discharge at their normal or stand rate as shown by the slope of their line segments during this interval. At time T1, when the state of charge information transmitted to the ground station shows that pack 30 has fully discharged, the charge controller 18 is connected to all four packs 30–36 in series. To reduce the reconditioning time and to prevent overcharging, the reconditioning loads 62, 64 and 66 are connected respectively across the packs 32, 34 and 36 by closing the switches 72, 74 and 76, respectively under control from the ground station transceiver 57. With the reconditioning resistor 60 removed from the pack 30, it accumulates a charge at a relatively high rate shown by the slope of the line segment while the packs 32–36 accumulate a charge at a slower rate, one-half that of the charging rate of pack 30, as shown by the slope of their line segments. While ground control may select any one or more of the sensors 50–56 to control charge termination it is assumed in FIG. 2 that the sensor 56 has been selected for supplying the charge termination signal. Accordingly, at time T2 the input to the transceiver 58 from the sensor 56 causes the relay circuitry 22 to open the switch 20 and terminate charging of the battery 14. While the termination of the charge cycle is controlled on board, it will be appreciated that ground control may override the termination command.

From the time period T2 to T3, the packs 32–36 discharge at an accelerated rate indicated by the slope of their line segments during this time interval, while the pack 30 discharges at it normal or stand rate. At time T3, the reconditioning load is removed from the pack 36 and it also begins to discharge at the normal rate. At time T4, the reconditioning load 64 is removed from the pack 34 and it also begins to discharge at its normal rate. The pack 32 continues to discharge at an accelerated rate until fully discharged at time T5 at which time the reconditioning load 62 is removed, the charger 18 is activated and the reconditioning loads 60, 64 and 66 are reconnected across the packs 30, 34 and 36, respectively.

At time T6, the state of charge sensor for pack 36 again indicates a 100% charge state and charging is terminated. During the charging time interval between T5 and T6, the reconditioning resistors 60, 64 and 66 are connected with the packs 30, 34 and 36 respectively, so that these packs are charged but at a reduced rate to reduce charging time but to prevent overcharging, while the pack 32 is charged at an accelerated rate. At time T6 when the charger 18 is disconnected from the battery 14, the reconditioning load 60 is removed from the pack 30 and the packs 30 and 32 discharge at a normal rate while the packs 34 and 36 discharge at an accelerated rate.

At T7, the reconditioning load 66 is removed from the pack 36 and at T8 the pack 34 becomes fully discharged. At T8, the reconditioning resistor 64 is removed from the pack 34 and the reconditioning loads are reconnected across the packs 30, 32 and 36 and a third charging cycle is initiated for the period T8 to T9 at which time the pack 36 again reaches a fully charged condition terminating the charging cycle. During the charging cycle between T8 and T9, the packs 30, 32 and 36 are charged at a reduced rate while the pack 34 is charged at an accelerated rate. At T9 the pack 36 is fully charged and the charging cycle terminates.

From T9 to T10 the pack 36 discharges at an accelerated rate to substantially 0% state of charge at T10 while the packs 30, 32 and 34 discharge at the normal rate. A new charging cycle is initiated during the period T10 to T11 with resistors 60, 62 and 64 connected across the packs 30, 32 and 34. At T11 a charge termination signal is received from the sensor 56. It will be noted that during the final charging cycle the packs 30 and 32 are charged beyond the fully charged condition. This is done to permit a recalibration of the pressure limit at full charge since that limit tends to drift with time. Other scenarios may be selected to accomplish sequential reconditioning, one pack at a time, while maintaining three other packs with sufficient energy storage all the while minimizing overcharge of any pack.

If a fault occurs during reconditioning, either the reconditioned pack supplies any residual stored energy, or the pack becomes reversed biased by the remaining charged cells in the unreconditioned packs, forward biasing the high current by-pass diodes shunting the pack to thereby supply the necessary current to clear the fault.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A battery reconditioning system for a spacecraft having a single battery serving as a secondary source of electrical energy to support spacecraft electrical loads, said battery including a plurality of serially connected packs each comprising a plurality of cells, the system comprising: sensor means for sensing the state of charge of each of said packs, reconditioning load means associated with each of said packs, battery charging means, switch means for connecting a reconditioning load means across its associated pack, switch control means responsive to the state of charge of said packs for controlling said switch means and said charging means to selectively and sequentially recondition each of said packs while said packs remain serially connected.

2. The system defined in claim 1 wherein said battery is a nickel hydrogen battery, said sensor means is responsive to the pressure in said packs to provide a state of charge indication, and diode means are connected in parallel with each of said packs for providing a current path to said spacecraft electrical loads which bypasses said packs when said diode means are forward biased.

3. The system defined in claim 2 wherein said control means includes transceiver means for transmitting and receiving data between the spacecraft and a ground station, at least one of said sensor means providing a charge termination signal to the spacecraft transceiver means for terminating charging of the battery.

4. A battery reconditioning system for a spacecraft having a secondary source of electrical power comprising a single battery, said battery comprising a plurality of serially connected packs each containing a plurality of cells, sensing means for sensing the state of charge of each of said packs, reconditioning load means associated with each of said packs, battery charging means, control means for selectively connecting a load means with its associated pack to discharge said associated pack to a predetermined low state of charge and for thereafter disconnecting the selected load means from its associated pack and connecting said battery charging means across said serially connected packs, at least one of said sensing means providing a charge termination signal to said control means when one of said packs reaches a predetermined state of charge, diode means connected with each of said packs and providing a shunt current path bypassing said packs when said diode means are forward biased.

5. A method of reconditioning a battery having a plurality of serially connected packs, each of the packs including a plurality of cells, the method comprising the steps of:
    (a) discharging one of the packs to a predetermined low state of charge while the packs remain serially connected,
    (b) charging all of the packs while the packs remain serially connected until another of the packs reaches a predetermined high state of charge,
    (c) repeating steps (a) and (b) for each one of the packs.

6. A method of reconditioning a battery having a plurality of serially connected packs, each of said serially connected packs including a plurality of cells, the method comprising the steps of:
    (a) connecting a reconditioning load corresponding to one of said serially connected packs, the reconditioning load connected across said one of said serially connected packs until said one of said serially connected packs is discharged to a predetermined low state of charge;
    (b) disconnecting the reconditioning load corresponding to said one of said serially connected packs,
    (c) applying a charging current to all of said serially connected packs and connecting reconditioning loads corresponding to remaining ones other than said one of said serially connected packs, said reconditioning loads connected across said remaining ones other than said one of said serially connected packs while said charging current is applied to all of said serially connected packs, wherein the charging current is applied until one of said remaining ones of said serially connected packs is charged to a predetermined high state of charge,
    (d) removing the charging current from all of said serially connected packs until another one of said serially connected packs is discharged to said predetermined low state of charge,
    (e) disconnecting the reconditioning load corresponding to said another one of said serially connected packs, and
    (f) repeating steps (c), (d), and (e) until all of said serially connected packs have been reconditioned.

7. The system of claim 1 wherein said battery is a nickel hydrogen battery.

8. The system of claim 1 wherein said sensor means is responsive to the pressure in said packs to provide a state of charge indication.

9. The system of claim 1 further comprising diode means connected in parallel with each of said packs for providing a current path to said spacecraft electrical loads which bypasses said packs when said diode means are forward biased.

* * * * *